US010389708B1

(12) United States Patent
Goodsitt et al.

(10) Patent No.: US 10,389,708 B1
(45) Date of Patent: Aug. 20, 2019

(54) SECURE AUTHENTICATION OF A USER ASSOCIATED WITH COMMUNICATION WITH A SERVICE REPRESENTATIVE

(71) Applicant: Capital One Services, LLC, McLean, VA (US)

(72) Inventors: Jeremy Goodsitt, Champaign, IL (US); Austin Walters, Savoy, IL (US); Fardin Abdi Taghi Abad, Champaign, IL (US); Mark Watson, Urbana, IL (US); Anh Truong, Champaign, IL (US); Vincent Pham, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/239,149

(22) Filed: Jan. 3, 2019

(51) Int. Cl.
*G06F 21/00* (2013.01)
*H04L 29/06* (2006.01)
*H04L 9/32* (2006.01)
*G06F 7/04* (2006.01)
*H04M 3/51* (2006.01)
*H04L 9/06* (2006.01)

(52) U.S. Cl.
CPC ........ *H04L 63/0846* (2013.01); *H04L 9/0643* (2013.01); *H04M 3/51* (2013.01)

(58) Field of Classification Search
CPC ..... H04L 63/0846; H04L 9/0643; H04M 3/51
USPC ......... 726/4–7; 713/165, 168, 170, 182, 184
See application file for complete search history.

(56) References Cited

U.S. PATENT DOCUMENTS 7,739,744 B2 6/2010 Burch et al.
9,208,302 B2 12/2015 Kannavara et al.
9,218,476 B1 * 12/2015 Roth .................. H04L 63/0838
9,225,716 B2 12/2015 Tuchman et al.
2009/0323958 A1 * 12/2009 Schneider .............. H04L 9/085 380/277
2011/0135094 A1 * 6/2011 Muto .................... H04N 7/163 380/270
2014/0089683 A1 * 3/2014 Miller .................. H04L 63/061 713/193
2015/0350186 A1 * 12/2015 Chan .................... H04L 63/083 726/9

(Continued)

*Primary Examiner* — Aravind K Moorthy
(74) *Attorney, Agent, or Firm* — Harrity & Harrity, LLP

(57) ABSTRACT

A device detects a communication involving a user associated with an account and a service representative, and sends, to a user device associated with the account, an authentication notification that causes the user device to display an authentication field for the user. The device sends, to a service representative device associated with the service representative, a message that indicates that the service representative is to request, via the communication, the user to enter personal information associated with the user into the authentication field, where the user device is configured to generate a first authentication code based on a user input received from the user device in the authentication field. The device generates a second authentication code based on personal information associated with the account from a data structure, receives the first authentication code, and performs an action based on the first authentication code and the second authentication code.

20 Claims, 9 Drawing Sheets

(56) References Cited

U.S. PATENT DOCUMENTS

| | | | | |
|---|---|---|---|---|
| 2016/0027015 | A1* | 1/2016 | Redpath | G06Q 20/4012 705/72 |
| 2016/0219056 | A1* | 7/2016 | Wang | H04L 63/105 |
| 2017/0118205 | A1* | 4/2017 | Yang | H04L 9/3231 |
| 2017/0161486 | A1* | 6/2017 | Jeon | G06F 21/44 |
| 2017/0195118 | A1* | 7/2017 | Perretta | H04L 9/0643 |
| 2018/0075262 | A1* | 3/2018 | Auh | G06F 21/78 |
| 2018/0247049 | A1* | 8/2018 | Fang | H04L 9/32 |
| 2018/0263495 | A1* | 9/2018 | Cronin | A61B 5/024 |
| 2018/0367316 | A1* | 12/2018 | Cheng | H04L 9/3247 |
| 2019/0007205 | A1* | 1/2019 | Corduan | H04L 9/3236 |
| 2019/0095101 | A1* | 3/2019 | Leggette | G06F 3/067 |

* cited by examiner

SECURE AUTHENTICATION OF A USER ASSOCIATED WITH COMMUNICATION WITH A SERVICE REPRESENTATIVE

BACKGROUND

An authentication process may be performed to verify an identity of an individual. For example, when the individual contacts a call center of an entity regarding an account maintained by the entity, the call center may authenticate the individual to verify that the user is associated with the account and not a fraudulent actor attempting to gain unlawful access to the account.

SUMMARY

According to some implementations, a method may include detecting a communication to a call service center, wherein the communication is between a user device associated with a user, and a service representative device associated with the call service center. The method may include providing, to the user device, an authentication notification to request a first authentication code, wherein the authentication notification causes an authentication application to launch on the user device, wherein the authentication application generates the first authentication code by hashing a user input with a time-sensitive code, and wherein the user input is received by the authentication application from the user via a user interface of the user device in association with a request that the user provide a plurality of pieces of personal information. The method may include receiving the first authentication code, and generating a second authentication code, wherein generating the second authentication code comprises obtaining the plurality of pieces of personal information, corresponding to the authentication request, from a data structure, and hashing the plurality of pieces of personal information with the time-sensitive code to generate the second authentication code. The method may include performing an action based on whether the first authentication code matches the second authentication code.

According to some implementations, a device may include one or more memories, and one or more processors, communicatively coupled to the one or more memories, configured to detect a communication involving a service representative and a user associated with an account, and to send an authentication notification to a user device that is associated with the account, wherein the authentication notification causes the user device to display, via a user interface of the user device, an authentication field for the user. The one or more processors may send a message to a service representative device that is associated with the service representative, wherein the message indicates that the service representative is to request, via the communication, the user to enter personal information associated with the user into the authentication field, wherein the user device is configured to generate a first authentication code based on a user input received, via the user interface of the user device, in the authentication field. The one or more processors may generate a second authentication code based on personal information associated with the account from a data structure. The one or more processors may receive the first authentication code, and may perform an action based on the first authentication code and the second authentication code.

According to some implementations, a non-transitory computer-readable medium storing one or more instructions that, when executed by one or more processors, cause the one or more processors to identify an account associated with a user via a first communication interface associated with a service platform, and to obtain personal information associated with the account. The one or more instructions may cause the one or more processors to send an authentication notification to a user device associated with the user, wherein the authentication notification prompts the user to enter the personal information via a user interface of the user device to permit the user device to generate a first authentication code. The one or more instructions may cause the one or more processors to receive the first authentication code from the user device, to compare the first authentication code and a second authentication code generated based on the obtained personal information, and to perform an action based on the first authentication code and the second authentication code.

According to some implementations, a method may include detecting a communication with a user device of a user. The method may include providing, to the user device, an authentication request, wherein the request causes an authentication function to be presented on the user device, wherein the authentication function is configured to generate a first authentication code by hashing a user input received in association with a request for a piece of personal information of a user, and wherein the user input is received via a user interface of the user device. The method may include receiving the first authentication code from the user device, and generating a second authentication code, wherein generating the second authentication code comprises obtaining the piece of personal information from a data structure, and hashing the piece of personal information to generate the second authentication code. The method may include authenticating the user based on the first authentication code matching the second authentication code.

DETAILED DESCRIPTION

Figure 1A:
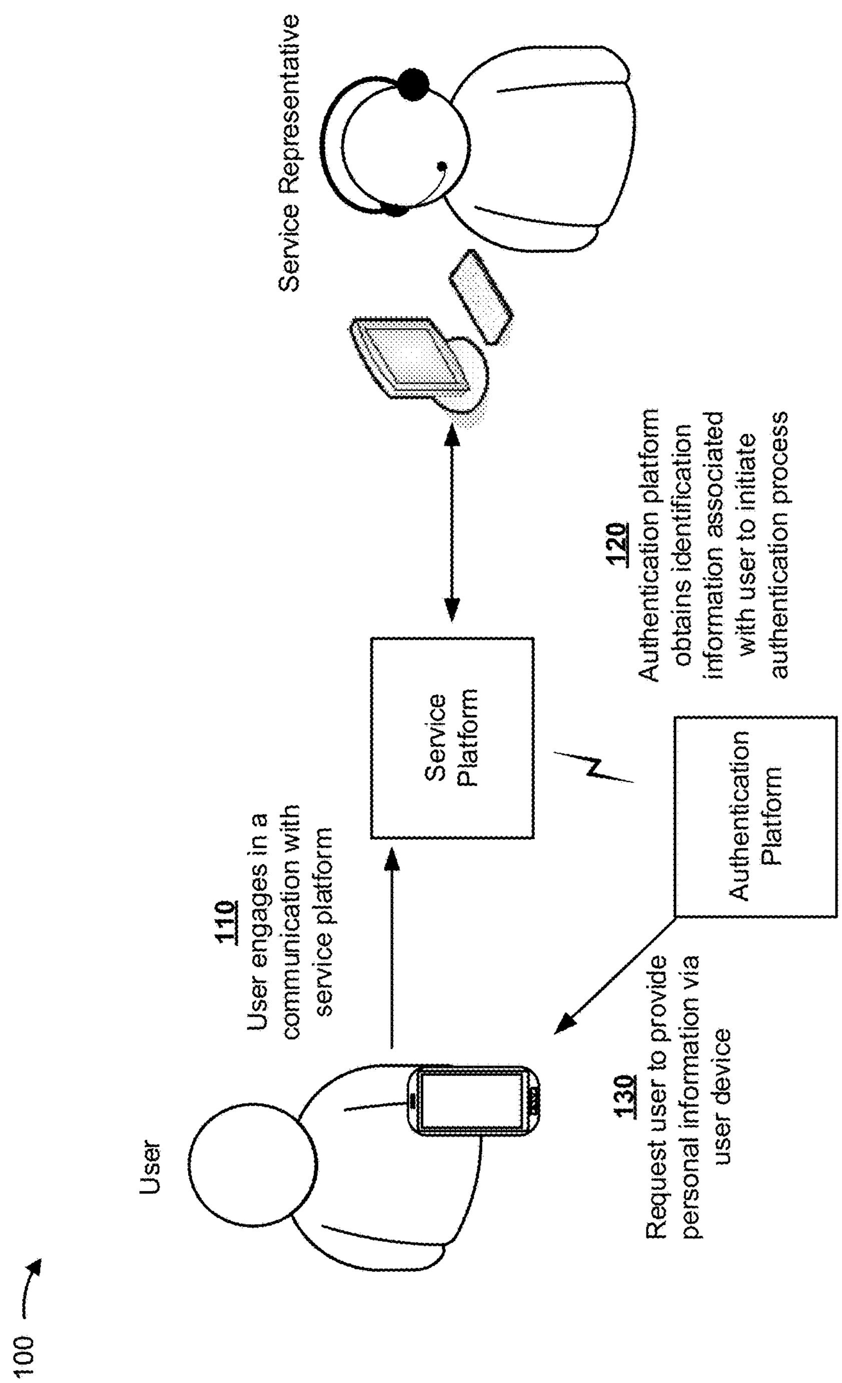
FIGS. 1A-1C are diagrams of an example implementation described herein.

The following detailed description of example implementations refers to the accompanying drawings. The same reference numbers in different drawings may identify the same or similar elements.

In many instances, when a user contacts a service representative of an entity regarding an account maintained by the entity (e.g., a member account, a financial account, and/or the like), the service representative authenticates the user to verify that the user is associated with the account and not a fraudulent actor attempting to gain unlawful access to the account. In such cases, to authenticate the user, the service representative may ask the user to verify authentication information (e.g., personal information associated with the account that was previously provided to the entity, account information associated with the account, and/or the like). If the user provides authentication information that matches the authentication information of the account, the service representative may authenticate the user and enable the user to access information associated with the account and/or perform an action associated with the account.

In many instances, such an authentication process takes place over a phone call and/or via a chat interface (e.g., an instant messaging interface). Accordingly, for the user to be authenticated, the user needs to share the authentication information over the phone call and/or through the chat interface. Therefore, that authentication information can relatively easily be acquired by any individual that is within range of hearing the user communicate the authentication information over the phone and/or by a hacker who has hacked the chat interface to fraudulently gain access to the authentication information. Furthermore, if the service representative has fraudulent intentions, the service representative may acquire such personal information and/or account information for fraudulent use (e.g., to gain access to the user's account). Therefore, using previous techniques for authentication via a service representative, a user's account and/or personal information may be put at risk due, for example, to authentication information that may be used to access the account being available to potentially fraudulent individuals.

Some implementations described herein provide a more secure system for secure authentication of a user. As described herein, the user may be communicating via a communication interface (e.g., a phone call, a chat interface, and/or the like) with a service platform (e.g., a call center platform) to initiate a communication with a service representative. Additionally, or alternatively, the user may be in communication with a service representative via the communication interface (e.g., the service platform forwarded the call to the service representative and/or engaged the service representative in a chat with the user). According to some implementations, an authentication platform is configured to authenticate the user without the user needing to communicate sensitive authentication information, such as sensitive personal information or sensitive account information, to the service platform or the service representative.

As described herein, after a user is identified via the communication interface (e.g., based on a caller identification (caller ID), entering identification information (e.g., account information, an identification number, and/or the like)), an authentication platform may request a user to provide authentication information via a user device (e.g., via an application of the user device, a message provided to the user device, and/or the like) associated with the user. The authentication information, which may include personal information and/or account information that is to be kept private, may then be used to generate an authentication code (e.g., via a hash function) that can be provided to authenticate the user. The authentication code may be compared to an authentication code that is generated by the authentication platform using authentication information, associated with the account, that corresponds to the authentication information requested from the user. The authentication platform and/or service representative (e.g., if the authentication codes are provided to the service representative) may compare the authentication codes to determine if the authentication codes match. Accordingly, the authentication platform and/or service representative may authenticate the user, in real-time, if the codes do match, and not authenticate the user, in real-time, if the authentication codes do not match.

Accordingly, rather than the individual having to share personal information and/or account information with the service representative (e.g., aloud via a phone call, through a chat interface that is susceptible to being hacked, and/or the like), the user may discreetly enter the personal information and/or account information into a user device, which is then used to generate an authentication code. In this way, the authentication code is communicated to the service representative (and/or authentication platform) such that the personal information and/or account information is not at risk of being obtained or acquired by a potentially fraudulent individual (i.e., an individual engaged in fraudulent activity). Accordingly, some implementations described herein may prevent fraudulent activity involving a user's account that may result from a fraudulent individual obtaining personal information and/or account information from the user while the user is communicating with a service platform and/or with a service representative. Therefore, the authentication platform, as described herein, may conserve computing resources (e.g., processing resources, memory resources, power resources, and/or the like) and/or network resources involved in correcting any fraudulent activity that would have been allowed without the use of the authentication platform described herein. Furthermore, the authentication platform, as described herein, enables improved authentication of a user that is communicating with a service provider and/or service representative, relative to previous techniques.

In some implementations, the authentication platform may authenticate the user before the user communicates with the service representative (e.g., before the service representative answers a phone call or enters the chat interface). For example, the authentication platform may identify the user via the communication interface and request the user to enter, via a user device and/or an application of the user device, a user input associated with requested personal information and/or account information. As described herein, the user device may generate an authentication code based on the user input and provide the authentication code to the authentication platform. Accordingly, the authentication platform may receive the authentication code and perform an authentication process by comparing the authentication code to an authentication code generated by the authentication platform using corresponding personal information and/or account information that was requested from the user via the user device. If the authentication codes match, the authentication platform may permit the user to engage in communication with the service representative via the communication interface.

In this way, several different stages of a process for authenticating a user in communication with a service platform and/or service representative are automated, which may remove human subjectivity and waste from the process, and which may improve speed and efficiency of the process and conserve computing resources (e.g., processor resources, memory resources, and/or the like). Furthermore, some implementations described herein use a rigorous, computerized process to perform tasks or activities that were not previously performed. For example, previously, there did not exist a technique to detect a communication with a user; provide an authentication request, to a user device of the user, that causes an authentication function to be performed on the user device to generate an authentication code based on a user input from the user; receive the authentication code and compare the authentication code to another authentication code generated based on corresponding information that is associated with the user input; and authenticate and/or enable authentication of the user based on the two authentication codes. Accordingly, computing resources associated with a service representative authenticating a user via a communication interface, as described herein, are conserved. Moreover, automating the process for authenticating the user (e.g., before the user is connected with a service representative), as described herein, conserves computing resources (e.g., processor resources, memory resources, and/or the like) that would otherwise be wasted by the service representative requesting authentication information via the communication interface, receiving authentication information via the communication interface, and authenticating the user. Furthermore, the authentication platform provides an improved user experience associated with authenticating the user in that the user is not placed in an uncomfortable position of providing personal information and/or account information to a service representative and/or in front of other individuals that may hear the personal information and/or account information. Accordingly, the user may be more comfortable knowing that personal information of the user is not subject to eavesdropping and/or hacking, and the entity may, thus, gain more customers and/or may satisfy their customers by protecting the personal information.

Figure 1B:
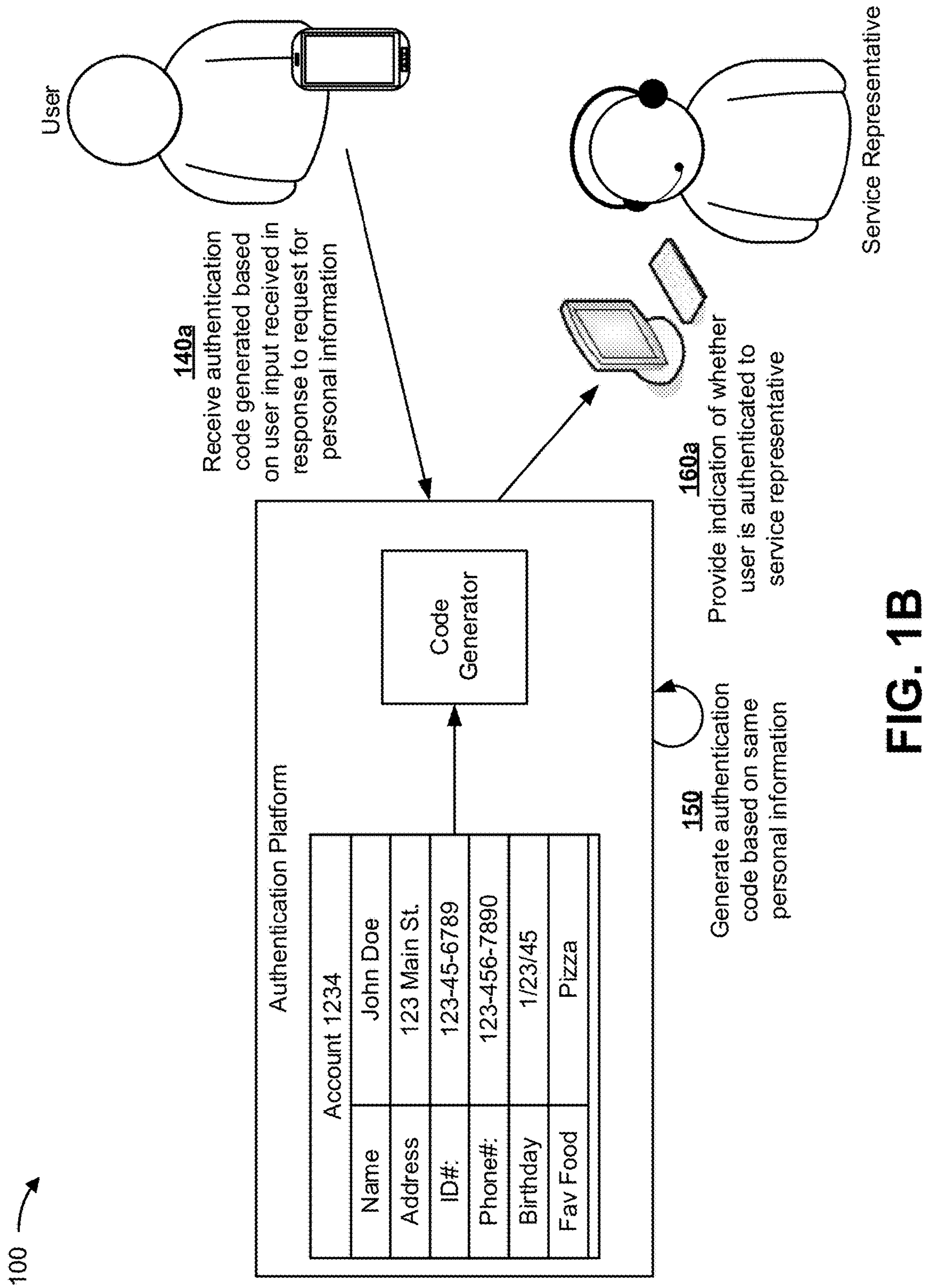
Figure 1C:
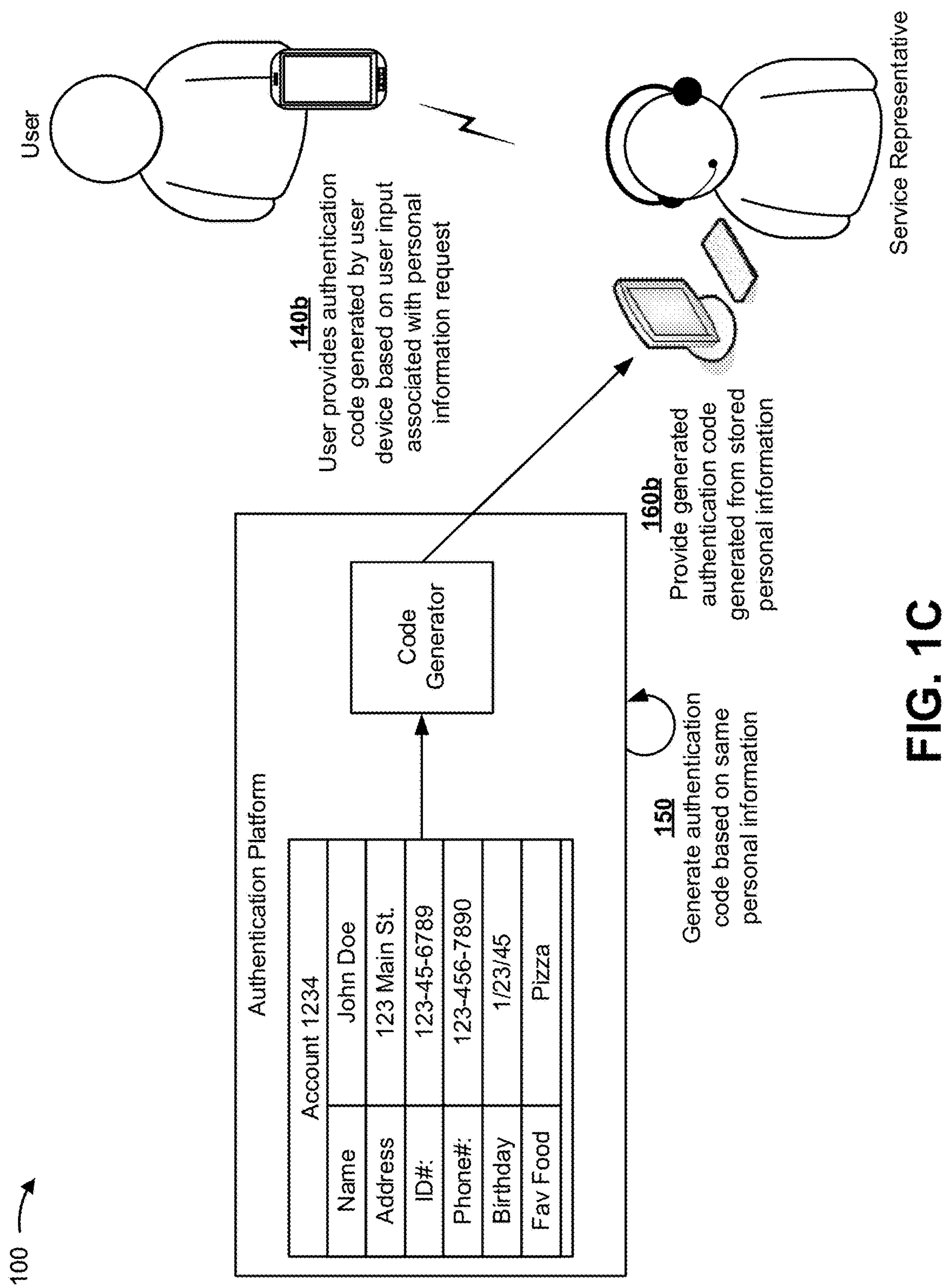

FIGS. 1A-1C are diagrams of an example implementation 100 described herein.

Example implementation 100 includes a user device, a service representative device, a service platform, and an authentication platform. As described herein, the service representative device, the service platform, and/or the authentication platform may be associated with an entity, such as an entity that provides a service to a user of example implementation 100.

As shown in FIG. 1A, and by reference number 110, the user engages in a communication with the service platform (e.g., to speak with a service representative). In some implementations, the user may engage in the communication via the user device and/or some other device (e.g., another user device, a telephone, such as a landline telephone, an online portal, and/or the like). As described herein, the communication may include speaking through a phone call, sending instant messages, email messages, text messages, and/or the like. Accordingly, the communication may be performed via a communication interface, such as the phone, a chat interface (e.g., used to exchange (send and/or receive) the instant messages), and/or the like. Therefore, the communication may involve real-time communication between the user and the service platform and/or between the user and the service representative.

In some implementations, the user initiates the communication with the service platform. For example, the user may contact (e.g., via a phone call, a chat interface, and/or the like) the service platform and/or service representative to discuss a matter associated with an account. More specifically, the user may contact the service platform and/or service representative to discuss a billing matter, engage in a transaction (e.g., to purchase a product, to pay for a service, and/or the like), apply to engage in a transaction (e.g., apply for a loan, apply to lease a product, and/or the like), and/or the like. In some implementations, the service platform and/or service representative may initiate the communication with the user. For example, the service platform and/or service representative may contact the user to verify information associated with the account, to verify a transaction involving the account, to provide information associated with the account, to request payment associated with the account, and/or the like.

As described herein, the account is associated with the entity in that the account may be used (e.g., by an authorized user) to interact with the entity (e.g., provide information to the entity, perform one or more actions involving the entity, such as make a payment to the entity or engage in a transaction with the entity, and/or the like). As described herein, the authentication platform performs an authentication process to verify that the user is associated with the account, in order to prevent fraudulent access to the account (e.g., by an unauthorized user). Accordingly, if the user is an authorized user of the account, the account may be considered an account of the user.

In some implementations, the service platform may perform one or more operations to identify the user (e.g., when the user initiates the communication). For example, the service platform may use a caller ID process to identify the user (e.g., by matching a phone number to a phone number associated with the account). Additionally, or alternatively, the service platform may prompt the user (e.g., via an automated call answering system and/or an automated information gathering system of a chat interface, and/or the like) to provide identification information associated with the user (e.g., a name, an identification number, an account number, and/or the like) via the communication interface, e.g., a microphone, touchscreen interface, keypad, or the like. In such cases, the user may be able to speak and/or provide the identification information via a user interface of the user device. Additionally, or alternatively, the service platform may identify the user based on the communication being initiated from an account associated with the entity. For example, the user may open a chat interface after the user logs in to a webpage or application that hosts the chat interface. In such cases, identification information associated with the account from which the user accessed the chat interface may be used to identify the user. Accordingly, the service platform may obtain identification information associated with the user and/or identification information associated with the account, and provide such identification information to the authentication platform to permit authentication of the user as described herein.

In some implementations, the service platform may request the user to indicate a purpose for the communication (e.g., to pay a bill, to dispute a bill, to engage in a transaction, to apply for a loan, to order a service and/or good, and/or the like). The service platform may use any suitable technique to determine the purpose of the call, such as natural language processing of speech and/or text from the user received via the communication interface, from an automated call answering system that prompts the user to provide the purpose of the call through a user input, from an automated information gathering system that prompts the user to select a purpose of the communication, and/or the like.

In some implementations, the authentication platform may detect the communication between the user and the service platform and/or between the user and the service representative. For example, the authentication platform may detect that a communication interface has been opened with the service platform and/or the service representative. Additionally, or alternatively, the authentication platform may detect the communication based on receiving identification information associated with the user. In some implementations, the authentication platform may suspend communication between the user and the service representative until the user is authenticated according to one or more of the implementations described herein. In this way, the user may be prevented from communicating with the service representative until the user is authenticated, to ensure that the user is not an unauthorized user (e.g., a fraudulent individual) and/or does not receive fraudulent access to an account of a customer of the entity via the communication with the service representative.

Accordingly, the user may engage in a communication with the service platform and/or the service representative to permit the user to be authenticated via an authentication process, as described herein. In some implementations, the authentication platform may detect the communication in order to permit the authentication platform to obtain identification information associated with the user and/or perform an authentication process as described herein. Additionally, or alternatively, the service representative may obtain the identification information and/or cause the authentication platform to initiate the authentication process (e.g., based on receiving the identification information from the user).

As further shown in FIG. 1A, and by reference number 120, the authentication platform obtains the identification information associated with the user, in order to initiate the authentication process. For example, the authentication platform may obtain the identification information from the service platform based on responses from the user provided to the automated answering system and/or the automated information gathering system of the service platform. Accordingly, the service platform may be configured to provide identification information to the authentication platform while the user is in communication with the service platform, to permit the authentication platform to authenticate the user.

In some implementations, the service representative may be engaged in the communication with the user and/or may obtain the identification information to initiate the authentication process. For example, the service representative may request the user to provide such identification information to the service representative via the communication, to permit the service representative to identify the user and/or to identify the account involved in the communication. In such cases, the service representative may provide the identification information to the authentication platform to permit the authentication platform to authenticate the user as described herein.

In this way, the authentication platform may obtain identification information of the user to permit the authentication platform to send an authentication notification and/or an authentication request to a user device of the user to initiate an authentication process as described herein.

As further shown in FIG. 1A, and by reference number 130, the authentication platform requests the user to provide personal information to the user device to authenticate the user. Although some implementations described herein discuss using personal information, additionally, or alternatively, any other type of authentication information (e.g., account information, passwords, and/or the like) may be used to authenticate a user as described herein. As described herein, the personal information may be used to generate an authentication code that the authentication platform uses to authenticate the user, without the user needing to share the personal information via the communication between the user and the service platform and/or via the communication between the user and the service representative.

As used herein, personal information may be any information associated with a customer (e.g., the user, if the user is associated with the personal information) of the entity that may have been provided to the entity and/or obtained by the entity. For example, the personal information may have been provided, by the customer (e.g., the user), to the entity in a previous communication, when registering the account, when updating the personal information in an account maintained by the entity, when engaging in a transaction with the entity, when providing the personal information for authentication purposes, and/or the like. More specifically, personal information may include a name, an identification number (e.g., a government-issued identification number, an account number, a member identification number associated with the entity, and/or the like), a date of birth, an address or location information, a password, an answer to an authentication question, a favorite item, a relative's name, a friend's name, and/or the like. Additionally, or alternatively, the personal information may be information associated with one or more transactions associated with the account (e.g., when a transaction was made, what the transaction involved, and/or the like). In some implementations, the personal information may be stored in a data structure (e.g., a database of customer information and/or customer accounts) in association with the account (e.g., as information of the account). Accordingly, the personal information, associated with an authorized user of the account, may be stored in a data structure prior to the user engaging in the communication with the service platform and/or the service representative. Therefore, if the user is an authorized user, the user may recall, via a user input device, the personal information that was previously provided to the entity to permit the authentication platform to authenticate the user.

In some implementations, the authentication platform may access and/or obtain the personal information (e.g., from the data structure) associated with the account to determine which personal information can be requested from the user to authenticate the user. For example, based on receiving the identification information, the authentication platform may access the account (e.g., in the data structure) to identify personal information that was provided to the entity. Further, the authentication platform may select which personal information is to be used to authenticate the user. Accordingly, the authentication platform may request personal information that is available to authenticate the user. In other words, the authentication platform may not request the user to provide personal information that cannot be verified by the authentication platform because the personal information was not previously provided or available to the entity. In some implementations, the authentication platform may randomly select which personal information is to be used to authenticate the user. Additionally, or alternatively, the authentication platform may select the personal information and/or an amount of the personal information (e.g., a quantity of pieces of the personal information) that is to be used to authenticate the user based on one or more characteristics of the user, one or more characteristics of the communication, and/or the like. For example, the authentication platform (e.g., from natural language processing and/or information received from the service platform) may determine the purpose of the communication, and, based on the purpose of the communication, select a quantity of pieces of personal information and/or select which pieces of personal information are to be used to authenticate the user. For example, if the user is calling to pay a bill, the authentication platform may request that only one piece of personal information (e.g., information printed on the bill) be provided, and if the user is calling to engage in a transaction and/or order goods or services, the authentication platform may request that the user provide more than one piece of personal information. Additionally, or alternatively, if the user is calling to pay a bill, the authentication platform may request that the user provides the user's date of birth or name (e.g., personal information that may be more readily available or easy for the user to input), and if the user is calling to engage in a transaction, the authentication platform may (alternatively or additionally) request the user to verify a relative's name, a friend's name, a favorite hobby of the user, and/or the like (e.g., personal information that is less likely to be available to an unauthorized user).

As described herein, the authentication platform may send an authentication notification to request the user to provide the personal information (e.g., via an authentication function of the user device). For example, the authentication notification may cause the user device to display, via a user interface of the user device, an authentication field to permit the user to enter the personal information. In some implementations, the authentication notification may provide a message and/or indication to the user to notify the user which personal information is to be provided and/or entered into the field. In some implementations, the authentication notification is received by the user device via an application installed on the user device. The application may be an authentication application and/or an application or browser plug-in that is associated with the entity (e.g., an application that permits the user to access the user's account with the entity, an application to perform one or more operations associated with the account (e.g., pay a bill, engage in a transaction, submit an application for a service offered by the entity, and/or the like), and/or the like). Accordingly, the authentication field may be a field of the application that the user may access by opening the application via the user device.

In some implementations, the user may need to log in to the application (e.g., using login information associated with the account, login information associated with the user device, a biometric of the user, and/or the like). In some implementations, the account may be registered to the application. In such cases, the user logging into the application may serve as an additional factor in the authentication platform authenticating the user. In some implementations, the authentication notification may provide instructions and/or prompt the user to download and install the application to permit the authentication platform to authenticate the user (e.g., if the application is not installed on the user device prior to the authentication platform sending the authentication notification).

In some implementations, the service representative may request the user to enter the personal information to authenticate the user. For example, the service representative may cause the user device to prompt the user to enter the personal information (e.g., by sending, from the service representative device, an authentication notification). Additionally, or alternatively, the service representative may request the user, via the communication, to navigate to the authentication field and input the personal information (e.g., a specific piece of personal information). Accordingly, in some implementations, the user device (and/or the application) provides the authentication code based on a request received from the service representative device (e.g., the service representative requests the user device and/or application to authenticate the user) and/or receiving a user input in an authentication field of the user device and/or application.

In some implementations, the authentication notification may be sent via a separate communication interface from the communication interface used for the communication between the user and the service platform and/or between the user and the service representative. For example, while the user may communicate with the service platform and/or the service representative via a phone call and/or a chat interface, the authentication notification may be received via a messaging protocol associated with the application of the user device, via a separate network, and/or the like.

In this way, the authentication platform may request a user to enter personal information and/or cause a user device to generate an authentication code based on a user input received in association with the request for the user input. The authentication platform may use the authentication code generated based on the user input to authenticate the user by comparing the authentication code to an authentication code generated by the authentication platform based on the personal information of the user in the data structure.

As shown in FIG. 1B, and by reference number 140*a*, the authentication platform may receive the authentication code that was generated based on the user input from the user that was provided in response to the request for the personal information. Accordingly, the user input may be the requested personal information if the user (presumably an authorized user) knows the personal information, or the user input may be information that is not the requested personal information because the user (presumably an unauthorized user) did not know the personal information that was requested.

As described herein, based on receiving the authentication notification, the user device may generate the authentication code based on the user input received from the user in response to the request for the personal information. Accordingly, the authentication notification may serve as an authentication request that causes an authentication function to be presented on the user device. For example, the authentication function may be launched independently from the application and/or launched within or by the application. In some implementations, the authentication function may cause the application to be launched (e.g., when the user unlocks the a mobile device and/or accesses a user interface of the mobile device) on the user device. As described herein, the authentication function may be configured to generate an authentication code based on the user input (which may be the requested personal information) that is provided by the user. For example, the authentication function may hash the user input to generate the authentication code and/or use the user input in a hash function (e.g., as an input to the hash function) to hash a time-sensitive code (e.g., a time-sensitive code provided by the authentication platform) with the user input to generate the authentication code (which may be a hash value of the hash function). The time-sensitive code may be an authentication code that is available for a limited amount of time (e.g., 10 minutes, 30 minutes, and/or the like) to authenticate the user. Accordingly, the user device (e.g., via the application) may be configured to receive a request associated with authenticating a user associated with the user device, prompt the user for personal information (e.g., one or more specific pieces of personal information requested by the authentication platform), receive a user input that is to be representative of the requested personal information, generate an authentication code based on the received user input, and provide the authentication code to the authentication platform to permit the authentication platform to authenticate the user.

According to some implementations, the authentication platform may use encryption when sending the authentication notification to the user device. For example, the user device (e.g., via the application) may be configured to receive the authentication notification using a public key/private key pair. For example, the user device (and/or application) may receive and/or be associated with a private key when the application is downloaded and/or installed on the user device, when the user registers an account (e.g., the account associated with the entity)—with the application, and/or the like. The user device may then receive an authentication notification, which is encrypted with a public key associated with the user device, and use the private key to decrypt the authentication notification. Accordingly, an added layer of security can be applied when requesting the user device to prompt the user for the personal information. As described herein, the authentication code generated by the user device (and/or the application of the user device) based on the user input may be compared to an authentication code generated by the authentication platform to authenticate the user.

The authentication platform may receive, from the user device, the authentication code associated with a user input via a different communication interface than the communication interface used in the communication between the user and the service platform and/or service representative. In some implementations, the authentication code may be received from the user device via a same communication interface used to send the authentication notification. Accordingly, the authentication platform may provide out-of-band authentication relative to the communication between the user and the service platform and/or between the user and the service representative.

In this way, the authentication platform may receive an authentication code from the user device to permit the authentication platform to authenticate the user based on a user input used to generate the authentication code. Accordingly, the authentication platform may receive the authentication code without the user having to communicate the authentication code to the service representative, which may avoid human error in communicating the authentication code (e.g., if the service representative mishears the user).

As further shown in FIG. 1B, and by reference number 150, the authentication platform generates an authentication code based on the same personal information that was requested from the user. Furthermore, the authentication platform may generate the authentication code using a same code generation process (e.g., using a same hash function, a same input to the hash function (e.g., same time-sensitive code), and/or the like).

In some implementations, the authentication platform may obtain the personal information (e.g., the one or more pieces of personal information) that was requested from the user via the authentication notification. As mentioned above, the personal information may be stored in a data structure in association with the account identified via the communication. For example, assuming the user indicated that the user is associated with Account 1234 (e.g., the user indicated that the user's name was John Doe, the user provided the account number 1234, the service platform identified the phone number, and/or the like), as shown in FIG. 1B, the authentication platform may obtain personal information associated with Account 1234. The pieces of personal information, that are available for the authentication platform to authenticate the user and enable access to Account 1234, include the name, address, ID number, phone number, date of birth, and a favorite food. Accordingly, the authentication platform may use one or more of the pieces of personal information to authenticate the user.

As described herein, the authentication platform may generate (e.g., using a code generator) an authentication code based on the personal information. For example, the authentication platform may use the personal information in a hash function to generate the authentication code (which may be a hash value of the personal information). According to the hash function, the authentication platform may hash the personal information with a time-sensitive code (e.g., a same time-sensitive code that was provided in the authentication notification) to generate the authentication code. In some implementations, the authentication platform may use the personal information to hash the time-sensitive code to generate the authentication code. The time-sensitive code may be any code that is configured to expire after a threshold time period (e.g., relative to being generated, activated, and/or the like). For example, the time-sensitive code may be configured to only enable the hash function to generate the authentication code within a threshold time period (e.g., within 5 minutes, 10 minutes, an hour, and/or the like) of sending the authentication notification, and after the threshold time period expires, the hash function cannot generate the authentication code (e.g., because the time-sensitive code is voided). In some implementations, the time-sensitive code is a randomly generated code. Expiration of the time-sensitive code may be monitored and/or tracked using expiration information that is stored in a data structure associated with the authentication platform.

As described herein, the authentication platform may provide, to the user device and in the authentication notification, the hash function, information indicating which personal information is to be requested from the user, the time-sensitive code, and/or instructions to generate the authentication code to permit the user device to generate the authentication code based on the user input, such that the authentication code generated by the authentication platform would match the authentication code generated by the user device if the user inputs the correct personal information. Accordingly, to authenticate the user, the authentication platform may compare the authentication code that is generated from the user input by the user device with the authentication code generated from the personal information associated with the account by the authentication platform. Following that comparison, the service platform may authenticate the user based on whether the authentication codes match.

As described herein, the authentication codes may be considered secure authentication codes in that the authentication codes are separately generated from separate inputs (the user input received based on the request for the personal information and the stored personal information). The separate authentication codes may indicate whether or not the user is to be authenticated because the authentication code generated by the authentication platform was generated from the same personal information that was requested from the user to enable the authentication code to be generated by the user device. Therefore, if the authentication codes do not match, the authentication platform can determine that the user did not provide personal information that matches the stored personal information, and thus is likely an unauthorized user. Furthermore, if the authentication codes do match, the authentication platform can determine that the user did provide personal information that matches the stored personal information, and thus, the user is likely an authorized user.

In this way, the authentication platform may determine whether the user is authenticated, in order to permit the service representative to communicate with the user (e.g., if the user is authenticated) or to prevent the service representative from communicating with the user (e.g., if the user is not authenticated).

As further shown in FIG. 1B, and by reference number 160*a*, the authentication platform indicates whether the user is authenticated to the service representative. For example, the authentication platform may send a message (e.g., a verification message that the user is authenticated or a non-verification message that the user is not authenticated)

and/or a notification that can be presented to the service representative via the service representative device. Additionally, or alternatively, the authentication platform may send a message and/or notification to the user (e.g., to the user device) indicating that the user has been authenticated and/or that an authorized access to the account is ongoing. In some cases, if the user is, in fact, a fraudulent user but was authenticated as described herein, the notification to a customer associated with the account may indicate to the customer that the fraudulent user accessed the account via the service platform or the service representative).

In some implementations, if the authentication platform determines that the user is authenticated (e.g., the authentication codes match), the authentication platform may set up a communication interface between the user and the service representative. For example, the authentication platform may cause the service platform to forward a call to the service representative to permit the user to communicate with the service representative. Additionally, or alternatively, the authentication platform may cause the service platform to open a chat interface on the service representative device to permit the service representative to communicate with the user. Accordingly, if the communication interface between the service platform and the user is a first communication interface, the authentication platform may cause or enable a second communication interface to be established between the user and the service representative.

In some implementations, if the authentication platform determines that the user is not authenticated (e.g., the authentication codes do not match), the authentication platform may perform one or more actions to prevent the user from accessing the account. For example, the authentication platform may prevent the user from discussing the account with the service representative (e.g., by ending the communication between the user and the service representative, by disconnecting the user from the service platform, and/or the like). In some implementations, the authentication platform may cause the service platform to notify the user via the communication (e.g., using an automated message) that the user failed the authentication process, that the user is not authorized to access the account, that the user is not authorized to communicate with a service representative, and/or the like. In some implementations, if the user fails a first authentication process, as described herein, the authentication platform may permit the user to undergo a second authentication process to authenticate the user. In such cases, the authentication platform may automatically enable the user to undergo a threshold number of authentication processes until the user is disconnected from the service platform. In some implementations, if the user is not authenticated, the authentication platform may cause the account identified by the user to be flagged as the subject of fraudulent activity, may freeze funds associated with the account, may notify a customer associated with the account that an unauthorized access or a potential fraudulent access to the customer's account was attempted, and/or the like.

In this way, the authentication platform may indicate to the service representative, the entity, and/or a user associated with the account whether the user was authenticated to permit the user to interact with the service representative regarding an account or prevent the user from accessing the account.

As shown in FIG. 1C, and by reference number 140*b*, the user provides the authentication code that is generated by the user device based on the user input associated with the personal information request (e.g., based on the requested personal information in the authentication notification). For example, the user device, application, and/or authentication function may be configured to generate the authentication code, as described herein, and present the authentication code to the user via the user interface (e.g., a display device) of the user device. Accordingly, the user may read the authentication code, presented via the user interface, and communicate the authentication code to the service representative. In this way, network resources associated with the user device sending the authentication code to the authentication platform can be conserved.

In some implementations, the service representative may request (e.g., via the communication) that the user provide the authentication code to the service representative. For example, based on determining that the user is communicating with the authentication platform, the authentication platform may send a message to or prompt the service representative that indicates that the service representative is to request the user to read the authentication code to the service representative. Accordingly, the service representative may correspondingly request that the user provide the authentication code to the service representative to permit the service representative (and/or authentication platform) to authenticate the user. Additionally, or alternatively, the service representative, before requesting the authentication code, may provide instructions to the user to assist the user with entering the requested personal information into the user device (e.g., via the application and/or authentication function). Accordingly, the service representative may communicate with the user, according to instructions from the authentication platform, to assist the user with entering a user input associated with requested personal information to enable the user device to generate the authentication code, as described herein.

In this way, the authentication platform may prompt the service representative to obtain the authentication code from the user, and the service representative may receive the authentication code from the user to permit the service representative and/or the authentication platform to authenticate the user.

As further shown in FIG. 1C, and by reference number 150, the authentication platform may generate the authentication code based on the same personal information in a similar manner as described above in connection with FIG. 1B.

In some implementations, the authentication platform may receive the authentication code that was generated by the user device based on the user input from the service representative device (rather than from the user device as described above in connection with FIG. 1B). In some implementations, the service representative device may be configured to receive an authentication code via a user input from the service representative. For example, the service representative may enter the authentication code that was generated by the user device based on the user input from the user (e.g., the authentication code is presented to the user, and the user provides the authentication code to the service representative) and communicated to the service representative. The service representative device may forward the authentication code to the authentication platform to permit the authentication platform to determine whether or not the user is to be authenticated as described herein (e.g., based on whether the authentication code received from the service representative device matches the authentication code generated by the authentication platform).

As further shown in FIG. 1C, and by reference number 160*b*, the authentication platform provides the authentication code that was generated from the stored personal information. For example, the authentication platform may send the authentication code in a message to the service representative device to permit the service representative device to present the authentication code via a user interface of the service representative device. Accordingly, the service representative may have access to both the authentication code generated by the authentication platform and the authentication code generated by the user device (e.g., as received from the user via the communication). Accordingly, the service representative may have the necessary information (e.g., both authentication codes) to determine whether or not to authenticate the user. The service representative may compare the authentication codes and if they match, authenticate the user, and further engage in the communication with the user to permit the user to access the account. On the other hand, if the service representative determines that the access codes do not match, the service representative may indicate that the service representative cannot communicate with the user any further regarding the account, as the user was not authenticated.

In some implementations, the hash function and/or the time-sensitive code may be configured to convert the personal information and/or the user input into a value having a same fixed length. For example, the hash functions and/or time-sensitive codes used by the authentication function and/or authentication platform to generate the authentication codes may be configured to generate a four-digit number or character string, a six-digit number or character string, a nine-digit number or character string, and/or the like. Accordingly, when comparing the authentication code received from the user and the authentication code received from the authentication platform, the service representative may quickly determine whether the authentication codes match (e.g., rather than having to find a difference in a lengthy string of numbers and/or characters). Additionally, or alternatively, the authentication platform and/or user device (and application and/or authentication function) may be configured to only provide a certain portion of the authentication code to the service representative and the user, respectively. For example, the authentication platform may provide the last four, eight, twelve, and/or the like digits or characters of the authentication code generated by the authentication platform to the service representative, and the user device may provide the corresponding number of digits and/or characters of the authentication code generated by the user device to the user.

Accordingly, the service representative may be able to authenticate the user by personally comparing the authentication codes generated by the authentication platform and the user device. In this way, the user device, by presenting the respective authentication code to the user, may conserve network resources associated with sending the authentication code to the authentication platform, and the authentication platform may conserve computing resources associated with comparing the two authentication codes to authenticate the user.

As indicated above, FIGS. 1A-1C are provided merely as an example. Other examples may differ from what is described with regard to FIGS. 1A-1C.

Figure 2:
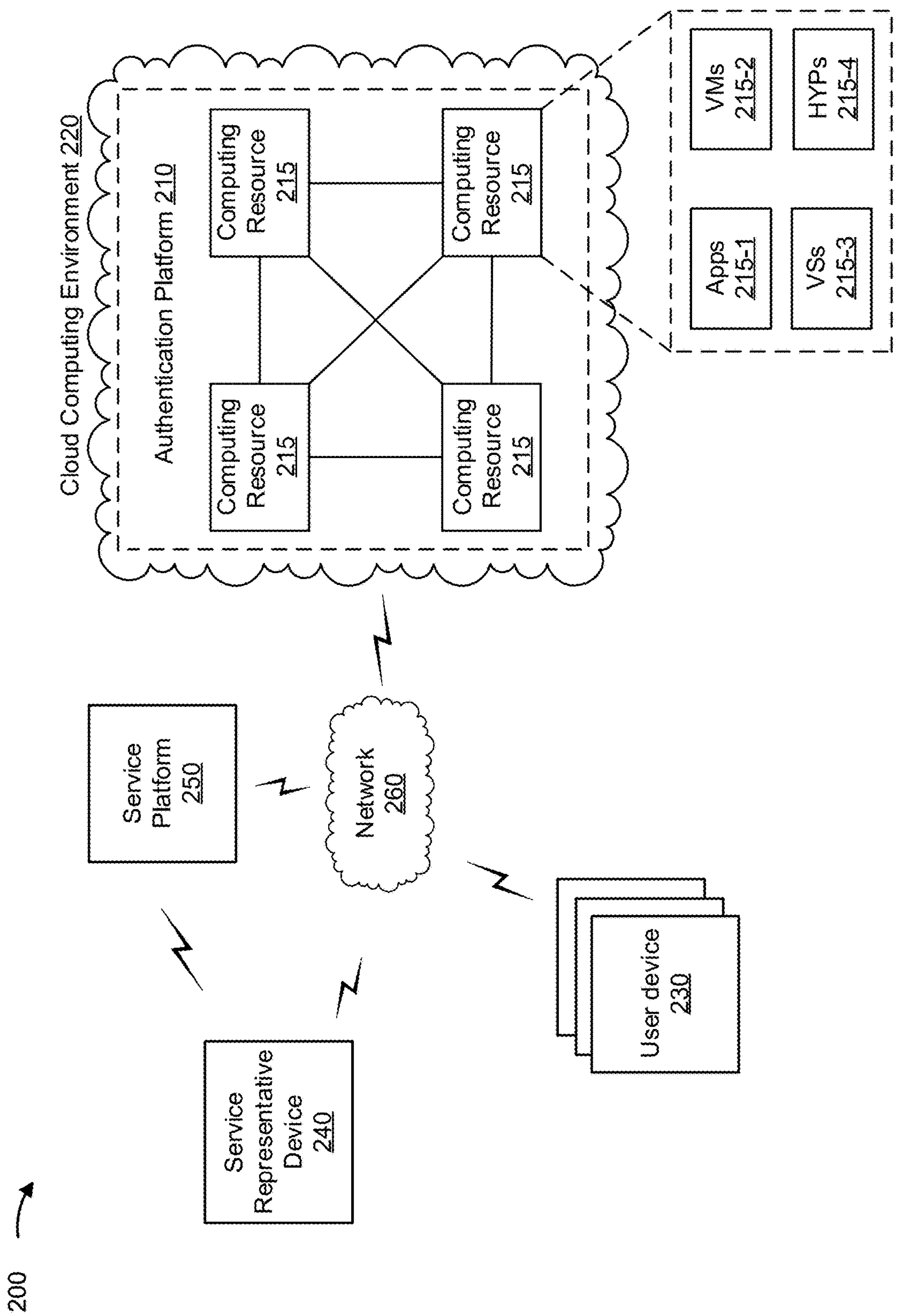
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an authentication platform 210, a computing resource 215, a cloud computing environment 220, a user device 230, a service representative device 240, a service platform 250, and a network 260. Devices of environment 200 may interconnect via wired connections, wireless connections, or a combination of wired and wireless connections.

Authentication platform 210 includes one or more computing resources assigned to perform secure authentication of a user. For example, authentication platform 210 may be a platform implemented by cloud computing environment 220 that may obtain, from a user device, an authentication code (e.g., from user device 230) generated based on user input received in response to a request for personal information from a user, generate an authentication code based on corresponding stored personal information, determine whether the user is authenticated based on the authentication code generated by and obtained from the user device and the authentication code generated by the authentication platform, provide (e.g., to service representative device 240) an indication of whether the user is authenticated, and/or the like. In some implementations, the authentication platform 210 is implemented by computing resources 215 of cloud computing environment 220.

Authentication platform 210 may include a server device or a group of server devices. In some implementations, authentication platform 210 may be hosted in the cloud computing environment 220. Notably, while implementations described herein describe authentication platform 210 as being hosted in cloud computing environment 220, in some implementations, the authentication platform 210 may be non-cloud-based or may be partially cloud-based.

Cloud computing environment 220 includes an environment that delivers computing as a service, whereby shared resources, services, etc., may be provided to user device 230, service representative device 240, service platform 250, and/or the like. Cloud computing environment 220 may provide computation, software, data access, storage, and/or other services that do not require end-user knowledge of a physical location and configuration of a system and/or a device that delivers the services. As shown, cloud computing environment 220 may include authentication platform 210 and computing resource 215.

Computing resource 215 includes one or more personal computers, workstation computers, server devices, or another type of computation and/or communication device. In some implementations, computing resource 215 may host authentication platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with authentication platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports the execution of a complete operating system ("OS"). A process virtual machine may execute a single program and may support a single process. In some implementations, virtual machine 215-2 may execute on behalf of a user (e.g., user device 230), and may manage the infrastructure of a cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

User device 230 includes one or more devices capable of receiving, generating, storing, processing, and/or providing information associated with a user contacting a service representative of an entity (e.g., via service representative device 240) regarding an account maintained by the entity. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a telephone, or a similar type of device.

Service representative device 240 includes one or more devices capable of receiving, generating, storing, processing, and/or providing information associated with a service representative of an entity. For example, service representative device 240 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), a telephone, or a similar type of device. In some implementations, the service representative may request, via service representative device 240, the user to enter the personal information to authenticate the user. In some implementations, service representative device 240 may be configured to receive an authentication code via a user input from the service representative. In some implementations, service representative device 240 may receive (e.g., from authentication platform 210) an indication of whether the user is authenticated and/or be configured to present an indication of whether the user is authenticated. In some implementations, service representative device 240 may forward the authentication code to authentication platform 210 to permit the authentication platform to determine whether or not the user is to be authenticated.

Service platform 250 includes a server device (e.g., a host server, a web server, an application server, etc.), a data center device, or a similar device. In some implementations, the user may engage in a communication with service platform 250. In some implementations, service platform 250 may perform one or more operations to identify the user (e.g., when the user initiates the communication). In some implementations, service platform 250 may request the user to indicate a purpose for the communication (e.g., to pay a bill, to dispute a bill, to engage in a transaction, to apply for a loan, to order a service and/or good, and/or the like).

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
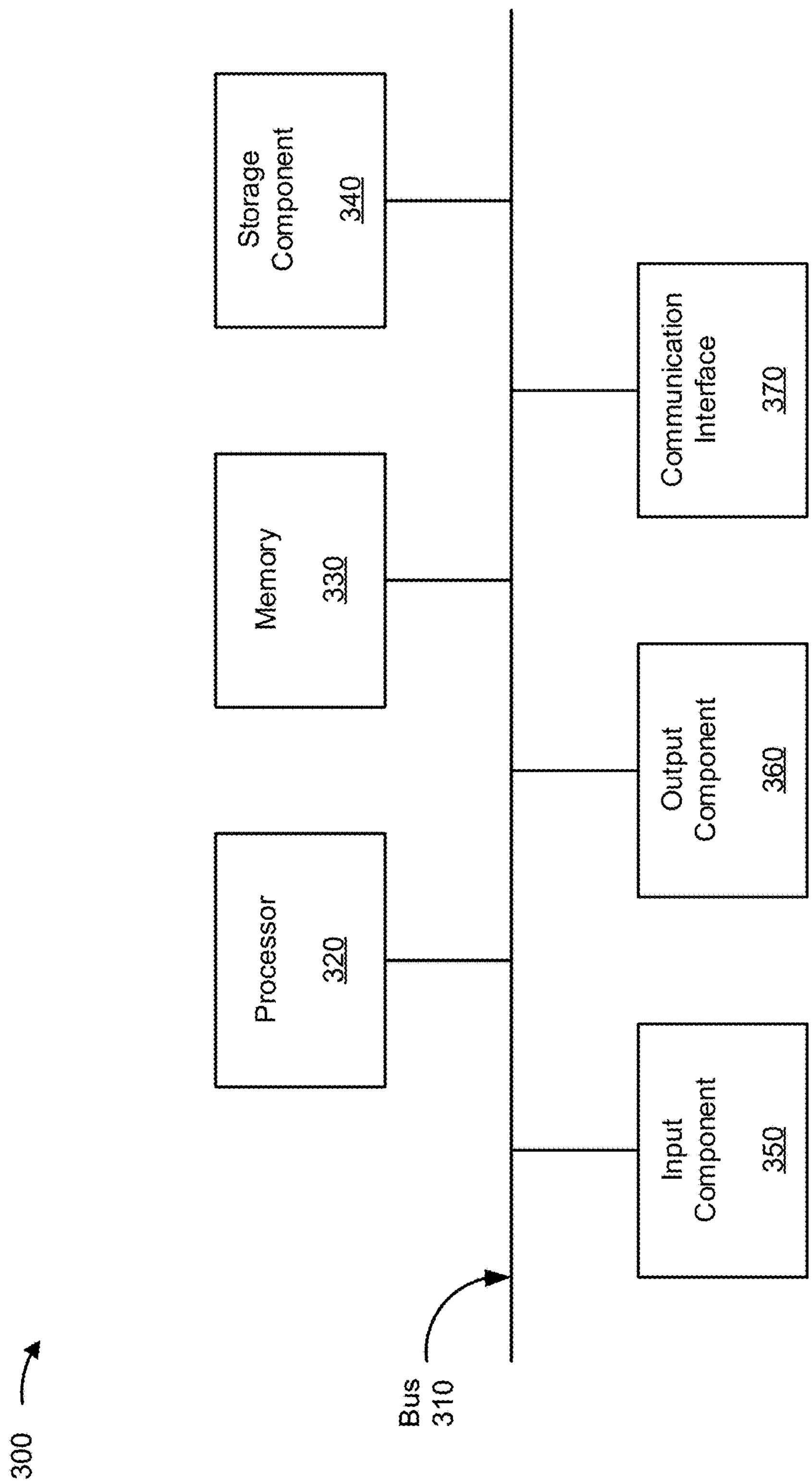
FIG. 3 is a diagram of example components of one or more devices of FIG. 2.

FIG. 3 is a diagram of example components of a device 300. Device 300 may correspond to authentication platform 210, computing resource 215, user device 230, service representative device 240, and/or service platform 250. In some implementations, the authentication platform 210, computing resource 215, user device 230, service representative device 240, and/or service platform 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read-only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
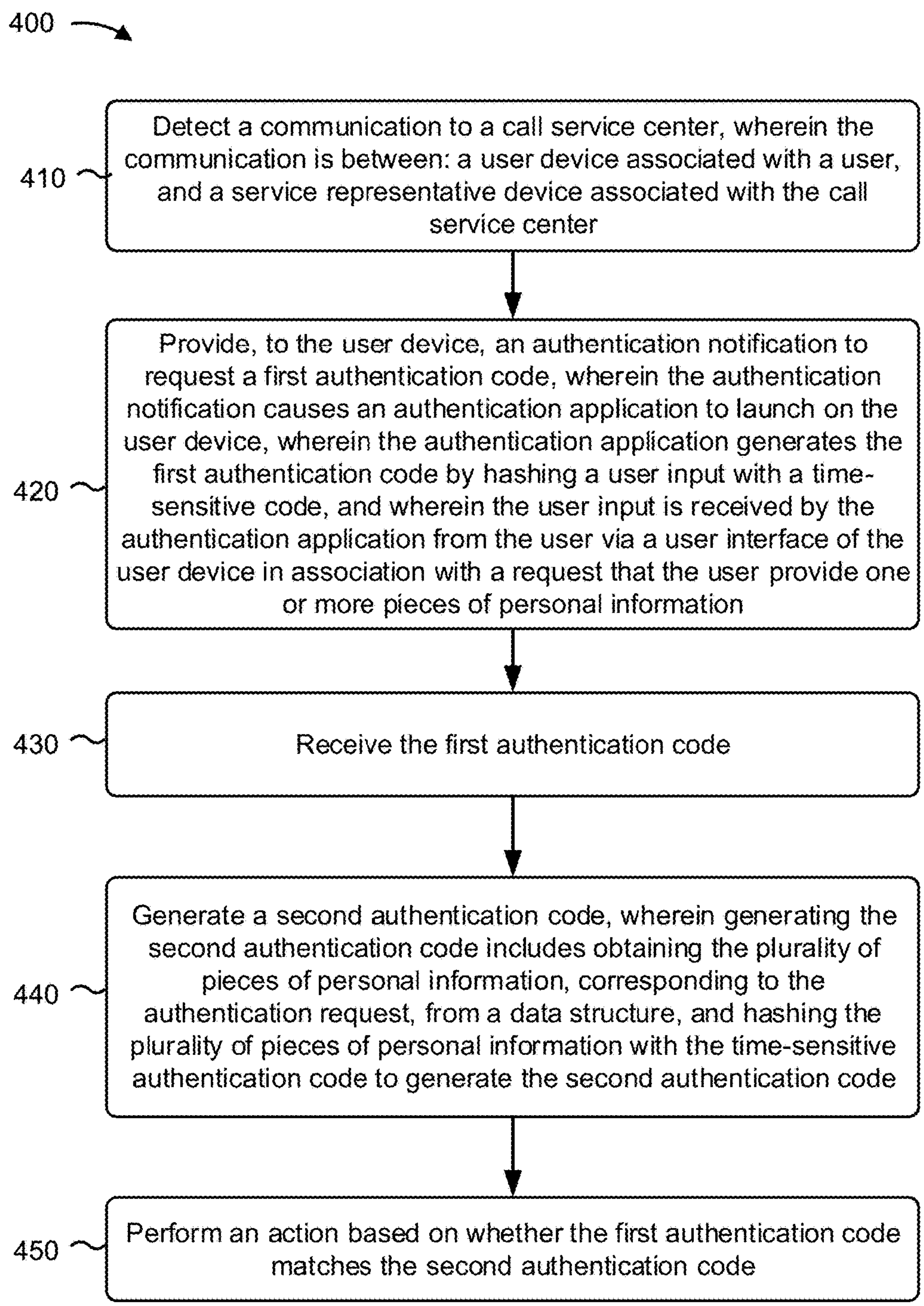
FIGS. 4-7 are flow charts of example processes for secure authentication of a user.

FIG. 4 is a flow chart of an example process 400 for secure authentication of a user. In some implementations, one or more process blocks of FIG. 4 may be performed by an authentication platform (e.g., authentication platform 210). In some implementations, one or more process blocks of FIG. 4 may be performed by another device or a group of devices separate from or including the authentication platform, such as a computing resource (e.g., computing resource 215), a user device (e.g., user device 230), a service representative device (e.g., service representative device 240), and a service platform (e.g., service platform 250).

As shown in FIG. 4, process 400 may include detecting a communication to a call service center, wherein the communication is between a user device associated with a user and a service representative device associated with the call service center (block 410). For example, the authentication platform (e.g., using computing resource 215, processor 320, memory 330, storage component 340, input component 350, communication interface 370, and/or the like) may detect a communication to a call service center, as described above. In some implementations, the communication is between a user device associated with a user and a service representative device associated with the call service center.

As further shown in FIG. 4, process 400 may include providing, to the user device, an authentication notification to request a first authentication code, wherein the authentication notification causes an authentication application to launch on the user device, wherein the authentication application generates the first authentication code by hashing a user input with a time-sensitive code, and wherein the user input is received by the authentication application from the user via a user interface of the user device in association with a request that the user provides one or more pieces of personal information (block 420). For example, the authentication platform (e.g., using computing resource 215, processor 320, memory 330, storage component 340, output component 360, communication interface 370, and/or the like) may provide, to the user device, an authentication notification to request a first authentication code, as described above. In some implementations, the authentication notification causes an authentication application to launch on the user device. In some implementations, the authentication application generates the first authentication code by hashing a user input with a time-sensitive code. In some implementations, the user input is received by the authentication application from the user via a user interface of the user device in association with a request that the user provides one or more pieces of personal information.

As shown in FIG. 4, process 400 may include receiving the first authentication code (block 430). For example, the authentication platform (e.g., using computing resource 215, processor 320, memory 330, the storage component 340, input component 350, communication interface 370, and/or the like) may receive the first authentication code, as described above.

As shown in FIG. 4, process 400 may include generating a second authentication code, wherein generating the second authentication code includes obtaining the one or more pieces of personal information, corresponding to the authentication request, from a data structure, and hashing the one or more pieces of personal information with the time-sensitive code to generate the second authentication code (block 440). For example, the authentication platform (e.g., using computing resource 215, processor 320, memory 330, storage component 340, and/or the like) may generate a second authentication code, as described above. In some implementations, generating the second authentication code includes obtaining the one or more pieces of personal information, corresponding to the authentication request, from a data structure, and hashing the one or more pieces of personal information with the time-sensitive code to generate the second authentication code.

As shown in FIG. 4, process 400 may include performing an action based on whether the first authentication code matches the second authentication code (block 450). For example, the authentication platform (e.g., using computing resource 215, processor 320, memory 330, storage component 340, input component 350, output component 360, communication interface 370, and/or the like) may perform an action based on whether the first authentication code matches the second authentication code, as described above.

Process 400 may include additional aspects, such as any single aspect or any combination of aspects described below and/or in connection with one or more other processes described elsewhere herein.

In some implementations, the quantity of pieces of information that is used for the first authentication code and the second authentication code may be based on a context of the communication. In some implementations, the authentication notification may cause the authentication application to be downloaded and installed on the user device before the authentication application is launched on the user device.

In some implementations, the authentication application may provide the first authentication code based on a request received from the service representative device. In some implementations, the one or more pieces of personal information may not be provided by the user device to the service representative device to authenticate the user.

In some implementations, the first authentication code is received from at least one of the user device, or the service representative device, where the service representative device is configured to receive the first authentication code via a second user input from the service representative, and where the user communicates, using the user device, the first authentication code to the service representative via the communication to permit the service representative to enter the second user input.

In some implementations, the authentication platform may send a verification message to a service representative device, associated with the service representative, to indicate that the user is authenticated when the first authentication code matches the second authentication code, and may send a non-verification message to the service representative device, associated with the service representative, to indicate that the user is not authenticated when the first authentication code does not match the second authentication code Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
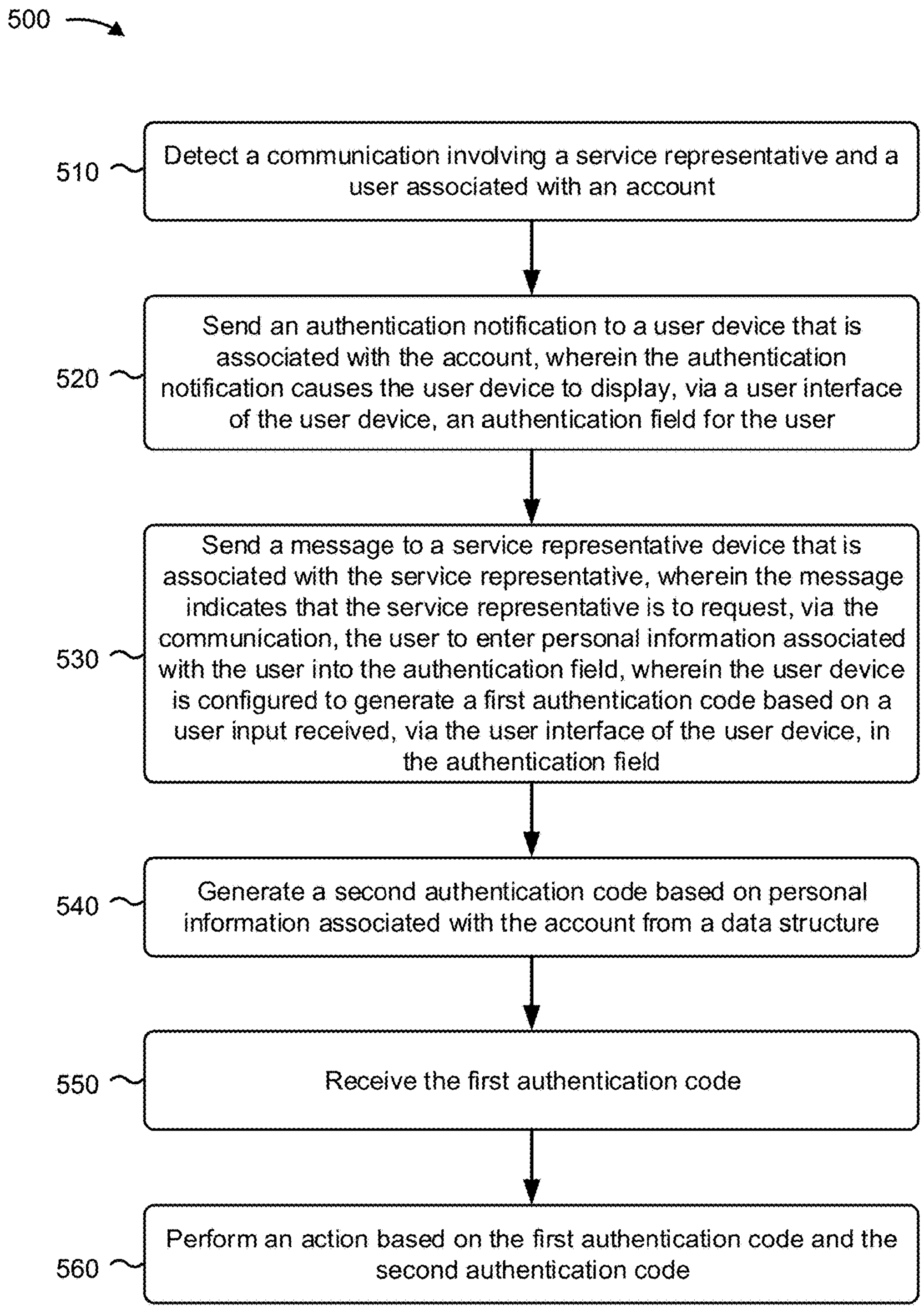

FIG. 5 is a flow chart of an example process 500 for secure authentication of a user. In some implementations, one or more process blocks of FIG. 5 may be performed by an authentication platform (e.g., authentication platform 210). In some implementations, one or more process blocks of FIG. 5 may be performed by another device or a group of devices separate from or including an authentication platform (e.g., authentication platform 210), such as a computing resource (e.g., computing resource 215), a user device (e.g., user device 230), a service representative device (e.g., service representative device 240), and a service platform (e.g., service platform 250).

As shown in FIG. 5, process 500 may include detecting a communication involving a service representative and a user associated with an account (block 510). For example, the authentication platform (e.g., using computing resource 215, processor 320, memory 330, storage component 340, input component 350, communication interface 370, and/or the like) may detect a communication involving a service representative and a user associated with an account, as described above.

As further shown in FIG. 5, process 500 may include sending an authentication notification to a user device that is associated with the account, wherein the authentication notification causes the user device to display, via a user interface of the user device, an authentication field for the user (block 520). For example, the authentication platform (e.g., using computing resource 215, processor 320, memory 330, storage component 340, output component 360, communication interface 370, and/or the like) may send an authentication notification to a user device that is associated with the account, as described above. In some implementations, the authentication notification causes the user device to display, via a user interface of the user device, an authentication field for the user.

As further shown in FIG. 5, process 500 may include sending a message to a service representative device that is associated with the service representative, wherein the message indicates that the service representative is to request, via the communication, the user to enter personal information associated with the user into the authentication field, wherein the user device is configured to generate a first authentication code based on a user input received, via the user interface of the user device, in the authentication field (block 530). For example, the authentication platform (e.g., using computing resource 215, processor 320, memory 330, storage component 340, output component 360, communication interface 370 and/or the like) may send a message to a service representative device that is associated with the service representative, as described above. In some implementations, the message indicates that the service representative is to request, via the communication, the user to enter personal information associated with the user into the authentication field. In some implementations, the user device is configured to generate a first authentication code based on a user input received, via the user interface of the user device, in the authentication field.

As further shown in FIG. 5, process 500 may include generating a second authentication code based on personal information associated with the account from a data structure (block 540). For example, the authentication platform (e.g., using computing resource 215, processor 320, memory 330, storage component 340, and/or the like) may generate a second authentication code based on personal information associated with the account from a data structure, as described above.

As further shown in FIG. 5, process 500 may include receiving the first authentication code (block 550). For example, the authentication platform (e.g., using computing resource 215, processor 320, memory 330, storage component 340, input component 350, communication interface 370, and/or the like) may receive the first authentication code, as described above.

As further shown in FIG. 5, process 500 may include performing an action based on the first authentication code and the second authentication code (block 560). For example, the authentication platform (e.g., using computing resource 215, processor 320, memory 330, storage component 340, input component 350, output component 360, communication interface 370, and/or the like) may perform an action based on the first authentication code and the second authentication code, as described above.

Process 500 may include additional aspects, such as any single aspect or any combination of aspects described below and/or in connection with one or more other processes described elsewhere herein.

In some implementations, when sending the authentication notification, the authentication platform may send the authentication notification to be received, by the user device, via an authentication application installed on the user device, where the account is registered with the authentication application, and where the authentication field is a field of the authentication application that is prompted after the user logs in to the authentication application using at least one of a login associated with the account or a login associated with the user.

In some implementations, a previous communication an authorized user associated with the account, an authorized user providing the personal information when registering the account, or an authorized user updating the personal information in the account.

In some implementations, when generating the second authentication code, the authentication platform may generate the second authentication code using a hash function, where the hash function hashes a time-sensitive code with the personal information associated with the account, and where the hash function and the time-sensitive code are provided to the user device in the authentication notification to permit the user device to correspondingly generate the first authentication code using the hash function and the time-sensitive code.

In some implementations, when receiving the first authentication code, the authentication platform may receive the first authentication code from the service representative device, where the service representative device is configured to receive the first authentication code via a user input from the service representative, and where the message indicates that the service representative is to request, via the communication, the user to communicate the first authentication code to the service representative via the communication.

In some implementations, the authentication platform may determine that the first authentication code matches the second authentication code, where the message is a first message, and where the authentication platform, when performing the action, may send a second message to the service representative device to indicate that the user is determined to be an authorized user of the account to permit the user to further communicate with the service representative.

In some implementations, the authentication platform may determine that the first authentication code does not match the second authentication code, where the message is a first message, and where the authentication platform, when performing the action, may send a second message to the service representative device to indicate that the user is determined to be an unauthorized user, and/or flag the account to indicate that an unauthorized access to the account was attempted.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
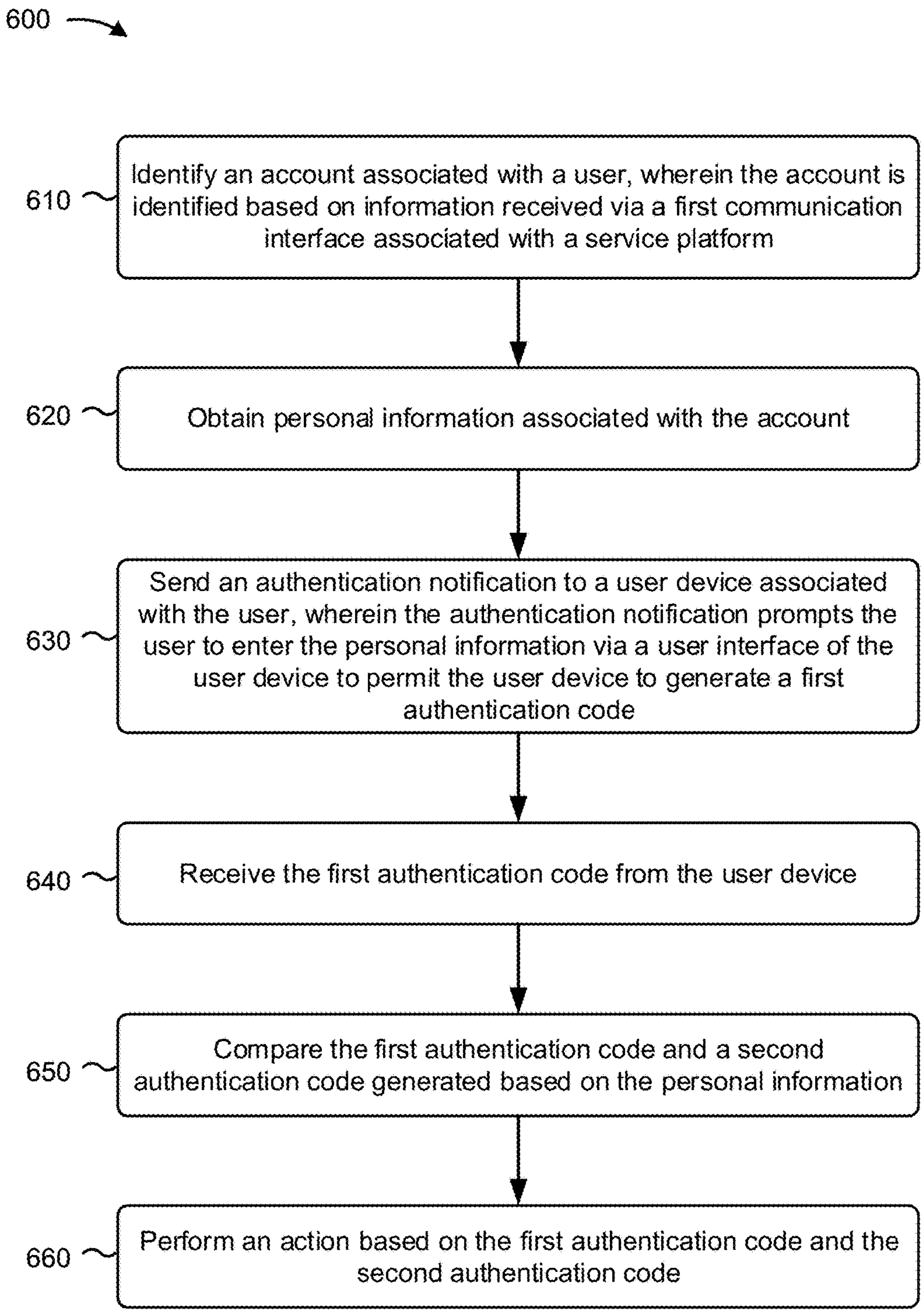

FIG. 6 is a flow chart of an example process 600 for secure authentication of a user. In some implementations, one or more process blocks of FIG. 6 may be performed by an authentication platform (e.g., authentication platform 210). In some implementations, one or more process blocks of FIG. 6 may be performed by another device or a group of devices separate from or including an authentication platform (e.g., authentication platform 210), such as a computing resource (e.g., computing resource 215), a user device (e.g., user device 230), a service representative device (e.g., service representative device 240), and a service platform (e.g., service platform 250).

As shown in FIG. 6, process 600 may include identifying an account associated with a user, wherein the account is identified based on information received via a first communication interface associated with a service platform (block 610). For example, the authentication platform (e.g., using computing resource 215, processor 320, memory 330, storage component 340, input component 350, communication interface 370, and/or the like) may identify an account associated with a user, as described above. In some implementations, the account is identified based on information received via a first communication interface associated with a service platform.

As further shown in FIG. 6, process 600 may include obtaining personal information associated with the account (block 620). For example, the authentication platform (e.g., using computing resource 215, processor 320, memory 330, storage component 340, input component 350, communication interface 370, and/or the like) may obtain personal information associated with the account, as described above.

As shown in FIG. 6, process 600 may include sending an authentication notification to a user device associated with the user, wherein the authentication notification prompts the user to enter the personal information via a user interface of the user device to permit the user device to generate a first authentication code (block 630). For example, the authentication platform (e.g., using computing resource 215, processor 320, memory 330, storage component 340, output component 360, communication interface 370, and/or the like) may send an authentication notification to a user device associated with the user, as described above. In some implementations, the authentication notification prompts the user to enter the personal information via a user interface of the user device to permit the user device to generate a first authentication code.

As further shown in FIG. 6, process 600 may include receiving the first authentication code from the user device (block 640). For example, the authentication platform (e.g., using computing resource 215, processor 320, memory 330, storage component 340, input component 350, communication interface 370, and/or the like) may receive the first authentication code from the user device, as described above.

As further shown in FIG. 6, process 600 may include comparing the first authentication code and a second authentication code generated based on the personal information (block 650). For example, the authentication platform (e.g., using computing resource 215, processor 320, memory 330, storage component 340, and/or the like) may compare the first authentication code and a second authentication code generated based on the personal information, as described above.

As further shown in FIG. 6, process 600 may include performing an action based on the first authentication code and the second authentication code (block 660). For example, the authentication platform (e.g., using computing resource 215, processor 320, memory 330, storage component 340, input component 350, output component 360, communication interface 370, and/or the like) may perform an action based on the first authentication code and the second authentication code, as described above.

Process 600 may include additional aspects, such as any single aspect or any combination of aspects described below and/or in connection with one or more other processes described elsewhere herein.

In some implementations, the personal information may be stored in association with the account before the user provided the identification information.

In some implementations, the authentication platform may generate the second authentication code using a hash function, where the hash function hashes a time-sensitive code with the personal information, and where the hash function and the time-sensitive code are provided to the user device in the authentication notification to permit the user device to correspondingly generate the first authentication code using the hash function and the time-sensitive code.

In some implementations, the authentication platform may determine that the first authentication code matches the second authentication code, where the one or more instructions, that cause the one or more processors to perform the action, cause the one or more processors to set up a second communication interface between the user and a service representative based on the first authentication code matching the second authentication code.

In some implementations, the authentication platform may determine that the first authentication code does not match the second authentication code, where the one or more instructions, that cause the one or more processors to perform the action, cause the one or more processors, based on determining that the first authentication code does not match the second authentication code, to indicate to the user, via the first communication interface, that the user is not authorized to communicate with the service platform, and/or to shut down the first communication interface.

In some implementations, the authentication notification may be sent via a second communication interface and the first authentication code may be received via the second communication interface. In some implementations, the first communication interface and the second communication interface are different communication interfaces.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
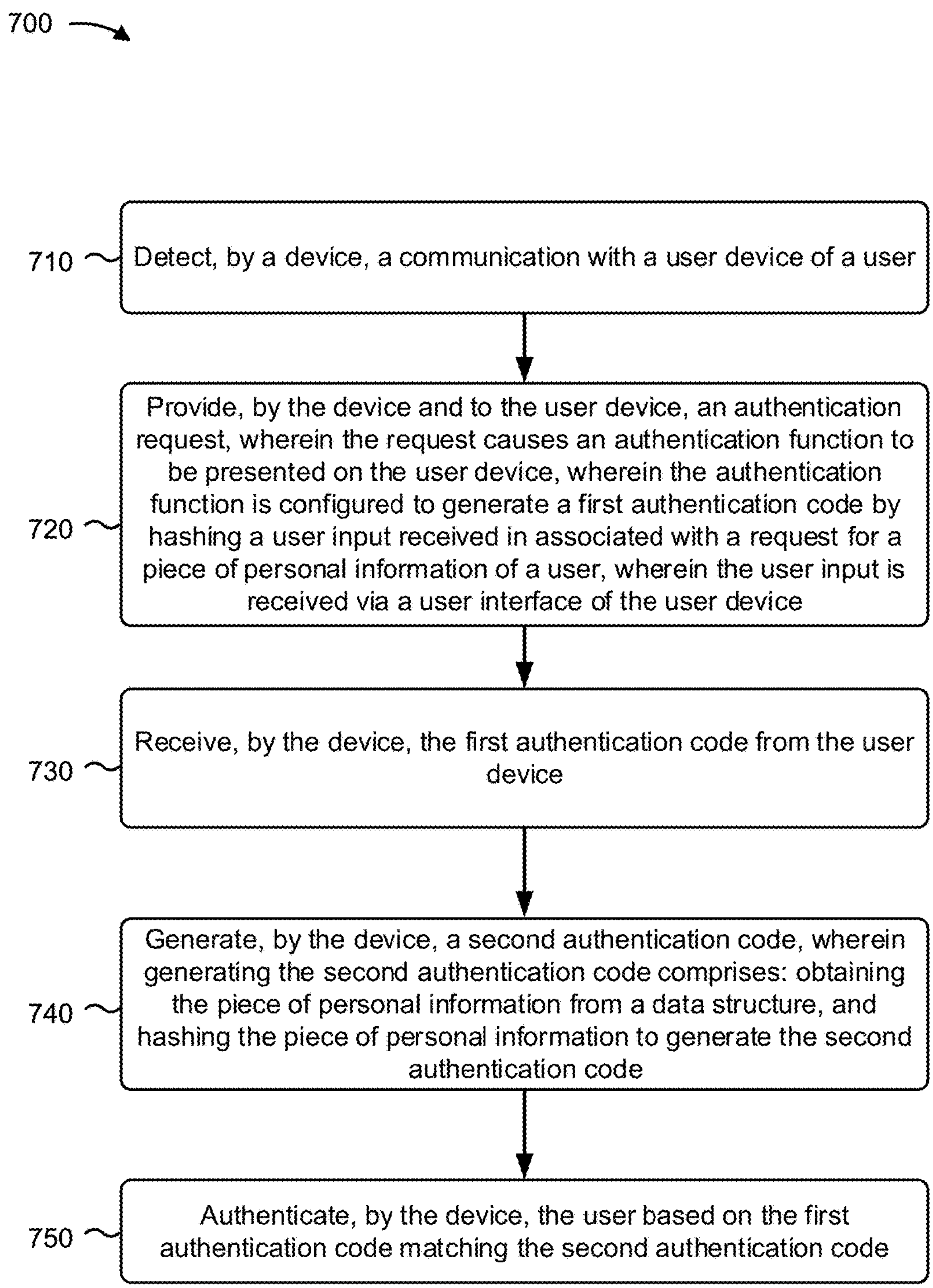

FIG. 7 is a flow chart of an example process 700 for secure authentication of a user. In some implementations, one or more process blocks of FIG. 7 may be performed by an authentication platform (e.g., authentication platform 210). In some implementations, one or more process blocks of FIG. 7 may be performed by another device or a group of devices separate from or including an authentication platform (e.g., authentication platform 210), such as a computing resource (e.g., computing resource 215), a user device (e.g., user device 230), a service representative device (e.g., service representative device 240), and a service platform (e.g., service platform 250).

As shown in FIG. 7, process 700 may include detecting a communication with a user device of a user (block 710). For example, the authentication platform (e.g., using computing resource 215, processor 320, memory 330, storage component 340, input component 350, communication interface 370, and/or the like) may detect a communication with a user device of a user, as described above.

As further shown in FIG. 7, process 700 may include providing, to the user device, an authentication request, wherein the request causes an authentication function to be presented on the user device, wherein the authentication function is configured to generate a first authentication code by hashing a user input received in association with a request for a piece of personal information of a user, wherein the user input is received via a user interface of the user device (block 720). For example, the authentication platform (e.g., using computing resource 215, processor 320, memory 330, storage component 340, output component 360, communication interface 370, and/or the like) may provide, to the user device, an authentication request, as described above. In some implementations, the request causes an authentication application to launch on the user device. In some implementations, the request causes an authentication function to be presented on the user device. In some implementations, the authentication function is configured to generate a first authentication code by hashing a user input received in association with a request for a piece of personal information of a user. In some implementations, the user input is received via a user interface of the user device.

As further shown in FIG. 7, process 700 may include receiving the first authentication code from the user device (block 730). For example, the authentication platform (e.g., using computing resource 215, processor 320, memory 330, storage component 340, input component 350, communication interface 370, and/or the like) may receive the first authentication code from the user device, as described above.

As further shown in FIG. 7, process 700 may include generating a second authentication code, wherein generating the second authentication code comprises obtaining the piece of personal information from a data structure, and hashing the piece of personal information to generate the second authentication code (block 740). For example, the authentication platform (e.g., using computing resource 215, processor 320, memory 330, storage component 340, and/or the like) may generate a second authentication code, as described above. In some implementations, generating the second authentication code comprises obtaining the piece of personal information from a data structure, and hashing the piece of personal information to generate the second authentication code.

As further shown in FIG. 7, process 700 may include authenticating the user based on the first authentication code matching the second authentication code (block 750). For example, the authentication platform (e.g., using computing resource 215, processor 320, memory 330, storage component 340, input component 350, output component 360, communication interface 370, and/or the like) may authenticate the user based on the first authentication code matching the second authentication code, as described above.

Process 700 may include additional aspects, such as any single aspect or any combination of aspects described below and/or in connection with one or more other processes described elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

detecting, by a device, a communication to a call service center,
  wherein the communication is between:
    a user device associated with a user, and
    a service representative device associated with the call service center;

determining, by the device, a context of the communication;

providing, by the device and to the user device, an authentication notification to request a first authentication code,
  wherein the authentication notification causes an authentication application to launch on the user device,
  wherein the authentication application generates the first authentication code by hashing a user input with a time-sensitive code,
  wherein the user input is received by the authentication application from the user via a user interface of the user device in association with an authentication request that the user provide a plurality of pieces of personal information, and
  wherein a quantity of the plurality of pieces of personal information is based on the context of the communication;

receiving, by the device, the first authentication code,
  wherein the first authentication code is based on the plurality of pieces of personal information;

generating, by the device, a second authentication code,
  wherein generating the second authentication code comprises:
    obtaining the plurality of pieces of personal information, corresponding to the authentication request, from a data structure, and
    hashing the plurality of pieces of personal information with the time-sensitive code to generate the second authentication code; and performing, by the device, an action based on whether the first authentication code matches the second authentication code.

2. The method of claim 1, wherein the authentication notification causes the authentication application to be downloaded and installed on the user device before the authentication application is launched on the user device.

3. The method of claim 1, wherein the authentication application provides the first authentication code based on a request received from the service representative device.

4. The method of claim 1, wherein the plurality of pieces of personal information are not provided by the user device to the service representative device to authenticate the user.

5. The method of claim 1, wherein the first authentication code is received from at least one of:

the user device, or the service representative device,
  wherein the service representative device is configured to receive the first authentication code via a second user input from the service representative, and
  wherein the user communicates, using the user device, the first authentication code to the service representative via the communication to permit the service representative to enter the second user input.

6. The method of claim 1, wherein performing the action comprises:

sending a verification message to the service representative device, associated with the service representative, to indicate that the user is authenticated when the first authentication code matches the second authentication code, and sending a non-verification message to the service representative device, associated with the service representative, to indicate that the user is not authenticated when the first authentication code does not match the second authentication code.

7. The method of claim 1, wherein the quantity of the plurality of pieces of personal information is based on one or more characteristics of the user.

8. A device, comprising:

one or more memories; and one or more processors, communicatively coupled to the one or more memories, configured to:

detect a communication involving a service representative and a user associated with an account;

determine a context of the communication;

send an authentication notification to a user device that is associated with the account, wherein the authentication notification is to be received by the user device via an authentication application installed on the user device, wherein the authentication notification causes the user device to display, via a user interface of the user device, an authentication field for the user;

send a message to a service representative device that is associated with the service representative, wherein the message indicates that the service representative is to request, via the communication, the user to enter a plurality of pieces of personal information associated with the user into the authentication field, wherein a quantity of the plurality of pieces of personal information is based on the context of the communication;

wherein the user device is configured to generate a first authentication code based on a user input received, via the user interface of the user device, in the authentication field, and wherein the authentication application generates the first authentication code by hashing the user input with a time-sensitive code;

generate a second authentication code based on personal information associated with the account from a data structure;

receive the first authentication code, wherein the first authentication code is based on the plurality of pieces of personal information; and perform an action based on the first authentication code and the second authentication code.

9. The device of claim 8, wherein the account is registered with the authentication application, and wherein the authentication field is a field of the authentication application that is prompted after the user logs in to the authentication application using at least one of a login associated with the account or a login associated with the user.

10. The device of claim 8, wherein the personal information is stored in the data structure based on at least one of:

a previous communication from an authorized user associated with the account, an authorized user providing the personal information when registering the account, or an authorized user updating the personal information in the account.

11. The device of claim 8, wherein the one or more processors, when generating the second authentication code, are configured to:

generate the second authentication code using a hash function, wherein the hash function hashes a time-sensitive code with the personal information associated with the account, wherein the hash function and the time-sensitive code are provided to the user device in the authentication notification to permit the user device to correspondingly generate the first authentication code using the hash function and the time-sensitive code.

12. The device of claim 8, wherein the one or more processors, when receiving the first authentication code, are configured to:

receive the first authentication code from the service representative device, wherein the service representative device is configured to receive the first authentication code via a user input from the service representative, wherein the message indicates that the service representative is to request, via the communication, the user to communicate the first authentication code to the service representative via the communication.

13. The device of claim 8, wherein the one or more processors are further configured to determine that the first authentication code matches the second authentication code, wherein the message is a first message, and the one or more processors, when performing the action, are configured to:

send a second message to the service representative device to indicate that the user has been determined to be an authorized user of the account, to permit the user to further communicate with the service representative.

14. The device of claim 8, wherein the one or more processors, are further configured to:

determine that the first authentication code does not match the second authentication code, wherein the message is a first message, and the one or more processors, when performing the action, are configured to at least one of:

send a second message to the service representative device to indicate that the user is determined to be an unauthorized user, or flag the account to indicate that an unauthorized access to the account was attempted.

15. A non-transitory computer-readable medium storing one or more instructions that, when executed by one or more processors, cause the one or more processors to:

detect a communication involving a service representative associated with a service platform and a user associated with an account;

determine a context of the communication;

obtain a plurality of pieces of personal information associated with the account;

send an authentication notification to a user device associated with the user, wherein the authentication notification is to be received by the user device via an authentication application installed on the user device, wherein the authentication notification prompts the user to enter the plurality of pieces of personal information via a user interface of the user device to permit the user device to generate a first authentication code, wherein the authentication application generates the first authentication code by hashing a user input with a time-sensitive code, and wherein a quantity of the plurality of pieces of personal information is based on the context of the communication;

receive the first authentication code from the user device, wherein the first authentication code is based on the plurality of pieces of personal information;

compare the first authentication code and a second authentication code generated based on the obtained plurality of pieces of personal information; and perform an action based on the first authentication code and the second authentication code.

16. The non-transitory computer-readable medium of claim 15, wherein the personal information is stored in association with the account before the account associated with the user is identified.

17. The non-transitory computer-readable medium of claim 15, wherein the one or more instructions, when executed by the one or more processors, further cause the one or more processors to:

generate the second authentication code using a hash function, wherein the hash function hashes a time-sensitive code with the personal information, wherein the hash function and the time-sensitive code are provided to the user device in the authentication notification to permit the user device to correspondingly generate the first authentication code using the hash function and the time-sensitive code.

18. The non-transitory computer-readable medium of claim 15, wherein the one or more instructions, when executed by the one or more processors, further cause the one or more processors to:

determine that the first authentication code matches the second authentication code, wherein the one or more instructions, that cause the one or more processors to perform the action, cause the one or more processors to:

set up a second communication interface between the user and the service representative based on the first authentication code matching the second authentication code.

19. The non-transitory computer-readable medium of claim 15, wherein the one or more instructions, when executed by the one or more processors, further cause the one or more processors to:

determine that the first authentication code does not match the second authentication code, wherein the one or more instructions, that cause the one or more processors to perform the action, cause the one or more processors, based on determining that the first authentication code does not match the second authentication code, to at least one of:

indicate to the user, via a first communication interface, that the user is not authorized to communicate with the service platform; or shut down the first communication interface.

20. The non-transitory computer-readable medium of claim 19, wherein the authentication notification is sent via a second communication interface and the first authentication code is received via the second communication interface, wherein the first communication interface and the second communication interface are different communication interfaces.

* * * * *